(12) United States Patent
Uthe (10) Patent No.: US 10,681,054 B2
(45) Date of Patent: *Jun. 9, 2020

(54) ENABLING A MULTI-DIMENSIONAL COLLABORATIVE EFFORT SYSTEM

(71) Applicant: International Business Machines Corporation, Armonk, NY (US)

(72) Inventor: Robert T. Uthe, Morrisville, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/361,414

(22) Filed: Mar. 22, 2019

(65) Prior Publication Data

US 2019/0222580 A1    Jul. 18, 2019

Related U.S. Application Data

(63) Continuation of application No. 14/865,148, filed on Sep. 25, 2015, now Pat. No. 10,320,797.

(51) Int. Cl.
*H04L 29/06* (2006.01)
*H04L 12/58* (2006.01)
*G06F 3/0482* (2013.01)

(52) U.S. Cl.
CPC .......... *H04L 63/102* (2013.01); *G06F 3/0482* (2013.01); *H04L 51/16* (2013.01)

(58) Field of Classification Search
CPC ....... H04L 63/08; H04L 63/083; H04L 63/10; H04L 63/102; H04L 63/104;

(Continued)

(56) References Cited

U.S. PATENT DOCUMENTS

| 5,008,853 A | 4/1991 | Bly et al. |
| 7,096,459 B2 | 8/2006 | Keller et al. |

(Continued)

FOREIGN PATENT DOCUMENTS

WO    2014/088559 A1    6/2014

OTHER PUBLICATIONS

Anonymous; Microsoft Lync 2010 Quick Reference Card; Microsoft; 2012; pp. 1-2; Retrieved from customguide.com.

(Continued)

*Primary Examiner* — Shanto Abedin
*Assistant Examiner* — Adrian Stoica
(74) *Attorney, Agent, or Firm* — Cantor Colburn LLP; Alexander Jochym (57) ABSTRACT

Methods to provide, by a processor, a user interface allowing a first user access to a collaborative effort system. Responsive to the first user utilizing the user interface, the methods, systems, and computer program products generate a plurality of threads within the collaborative effort system for a single discussion group of the collaborative effort system; authorize a second user access to at least a first thread of the plurality of threads after the generation of the plurality of threads; associate the second user with a user group after the generation of the plurality of threads; and authorize the user group access to at least a second thread of the plurality of threads. The methods generate a plurality of icons displayed in the user interface for the plurality of threads. The methods also displays in the user interface a priority of a problem to be solved through the collaborative effort system.

20 Claims, 5 Drawing Sheets

(58) Field of Classification Search
CPC ..... H04L 63/105; H04L 51/04; H04L 51/046;
H04L 51/08; H04L 51/12; H04L 51/14;
H04L 51/16; H04L 51/32; H04L 51/24;
H04L 65/40; H04L 65/4007; H04L
65/4015; H04L 65/4023; H04L 65/403;
H04L 65/4038; H04L 65/4046; H04L
65/4053; G06F 3/048; G06F 3/0481;
G06F 3/04817; G06F 3/0482; G06F
3/04842; G06F 3/04845
See application file for complete search history.

(56) References Cited

U.S. PATENT DOCUMENTS

| | | | |
|---|---|---|---|
| 7,200,638 B2 | 4/2007 | Lake | |
| 7,370,269 B1 | 5/2008 | Prabhu et al. | |
| 7,962,853 B2 | 6/2011 | Bedi et al. | |
| 8,060,820 B2 | 11/2011 | Bedi et al. | |
| 8,082,277 B1 | 12/2011 | O'Brien et al. | |
| 8,209,611 B2 | 6/2012 | Yoshimine | |
| 8,417,666 B2 | 4/2013 | Bailor et al. | |
| 8,533,608 B1 | 9/2013 | Tantiprasut | |
| 8,625,769 B1 | 1/2014 | Allen et al. | |
| 8,701,018 B1 | 4/2014 | Keel et al. | |
| 8,731,989 B2 | 5/2014 | Al-Ahaidib et al. | |
| 8,751,559 B2 | 6/2014 | Richardson et al. | |
| 8,805,935 B2 | 8/2014 | Kirkland et al. | |
| 9,542,292 B2 | 1/2017 | Sievert et al. | |
| 9,584,565 B1 | 2/2017 | Ho et al. | |
| 9,690,785 B1 | 6/2017 | Vagell | |
| 9,819,547 B2 | 11/2017 | Maini et al. | |
| 9,939,994 B2 | 4/2018 | Ali | |
| 10,120,552 B2 | 11/2018 | King et al. | |
| 2002/0083079 A1 | 6/2002 | Meier et al. | |
| 2002/0087520 A1 | 7/2002 | Meyers | |
| 2003/0041077 A1 | 2/2003 | Davis et al. | |
| 2003/0046355 A1 | 3/2003 | Rosenberg et al. | |
| 2003/0167443 A1 | 9/2003 | Meunier et al. | |
| 2004/0059783 A1 | 3/2004 | Kazui et al. | |
| 2004/0085354 A1 | 5/2004 | Massand | |
| 2004/0095378 A1 | 5/2004 | Vigue et al. | |
| 2005/0081139 A1 | 4/2005 | Witwer et al. | |
| 2005/0289088 A1 | 12/2005 | Tian et al. | |
| 2006/0053195 A1* | 3/2006 | Schneider | H04L 12/1827 709/204 |
| 2006/0200373 A1 | 9/2006 | Garg et al. | |
| 2007/0024594 A1 | 2/2007 | Sakata et al. | |
| 2007/0044076 A1 | 2/2007 | Allen, Jr. et al. | |
| 2007/0192155 A1 | 8/2007 | Gauger | |
| 2007/0250901 A1 | 10/2007 | McIntire et al. | |
| 2008/0201462 A1 | 8/2008 | Liss et al. | |
| 2008/0250007 A1 | 10/2008 | Masuyama et al. | |
| 2009/0019367 A1 | 1/2009 | Cavagnari et al. | |
| 2009/0094329 A1 | 4/2009 | Ambati et al. | |
| 2010/0223345 A1 | 9/2010 | Gupta et al. | |
| 2011/0093457 A1 | 4/2011 | Kobayashi | |
| 2011/0185288 A1 | 7/2011 | Gupta et al. | |
| 2011/0228921 A1 | 9/2011 | Singh et al. | |
| 2011/0258526 A1 | 10/2011 | Supakkul et al. | |
| 2012/0284516 A1 | 11/2012 | Errico | |
| 2012/0303772 A1 | 11/2012 | Ennis | |
| 2013/0198657 A1 | 8/2013 | Jones et al. | |
| 2013/0224714 A1 | 8/2013 | Ajmera et al. | |
| 2013/0232463 A1 | 9/2013 | Nagaraja et al. | |
| 2013/0304742 A1 | 11/2013 | Roman et al. | |
| 2014/0006768 A1 | 1/2014 | Carter et al. | |
| 2014/0068348 A1 | 3/2014 | Mondal et al. | |
| 2014/0129876 A1 | 5/2014 | Addepalli et al. | |
| 2014/0223416 A1 | 8/2014 | Cohen | |
| 2014/0280602 A1 | 9/2014 | Quatrano | |
| 2014/0317502 A1 | 10/2014 | Brown et al. | |
| 2015/0006837 A1 | 1/2015 | Schmidt et al. | |
| 2015/0065125 A1 | 3/2015 | Patel et al. | |
| 2015/0142825 A1 | 5/2015 | Deshmukh et al. | |
| 2015/0160799 A1 | 6/2015 | Won et al. | |
| 2015/0188768 A1 | 7/2015 | Maini et al. | |
| 2016/0148148 A1 | 5/2016 | Kumar et al. | |
| 2016/0378718 A1 | 12/2016 | Jarroush | |
| 2016/0378721 A1 | 12/2016 | Jarroush | |
| 2016/0380943 A1 | 12/2016 | Van Rensburg | |
| 2016/0380990 A1 | 12/2016 | Jarroush | |
| 2017/0011322 A1 | 1/2017 | Thomas | |
| 2017/0090736 A1 | 3/2017 | King | |
| 2017/0093644 A1 | 3/2017 | Paul et al. | |
| 2017/0093874 A1 | 3/2017 | Uthe | |
| 2018/0356970 A1 | 12/2018 | King et al. | |

OTHER PUBLICATIONS

Anonymous; Microsoft Lync 2010 Quick Reference Cards; Microsoft; 2011; pp. 1-10; Retrieved from microsoft.com.

List of IBM Patents or Patent Applications Treated As Related; Date Filed: Mar. 22, 2019, 2 pages.

* cited by examiner

ENABLING A MULTI-DIMENSIONAL COLLABORATIVE EFFORT SYSTEM

DOMESTIC PRIORITY

This application is a continuation of U.S. application Ser. No. 14/865,148, titled "ENABLING A MULTI-DIMENSIONAL COLLABORATIVE EFFORT SYSTEM" filed Sep. 25, 2015, the contents of which are incorporated by reference herein in its entirety.

BACKGROUND

The present invention relates to problem solving, and more specifically, to methods and systems to enable multi-dimensional collaborative effort systems.

Within systems management, problems may arise that may require collaborative efforts to resolve. Collaborative efforts may include conference calls and/or online group discussions, such as virtual war rooms and group chats. The group chat may be a vital collaboration tool, yet group chat programs and application may not be built to handle intense and time sensitive discussions and/or a large scale discussion having multiple aspects to it. One solution to a large scale discussion is to create multiple virtual group chats at the same time to probe into different areas. As multiple teams are divided up, there is more work or additional collaboration effort or tools that may be required to keep each of the separate groups connected and apprised of progress. One issue that may arise is that one group may not be able to easily and readily share information with another group as the other group may be part of a separate virtual war room.

SUMMARY

According to embodiments of the present invention, methods, systems, and computer program products are provided for providing, by a processor, a user interface allowing a first user access to a collaborative effort system. Responsive to the first user utilizing the user interface, the methods, systems, and computer program products generate a plurality of threads within the collaborative effort system for a single discussion group of the collaborative effort system, wherein each thread of the plurality of threads comprises a different sub-discussion group of the single discussion group of the collaborative effort system; authorize a second user access to at least a first thread of the plurality of threads after the generation of the plurality of threads; associate the second user with a user group after the generation of the plurality of threads; and after associating the second user with the user group, authorize the user group access to at least a second thread of the plurality of threads. The methods, systems, and computer program products generate a plurality of icons displayed in the user interface for the plurality of threads, wherein a first icon of the plurality of icons is displayed in the user interface in a first color coding, wherein a second icon of the plurality of icons is displayed in the user interface in a second color coding. The methods, systems, and computer program products also generate a third and fourth icon displayed in the user interface to indicate that the second user is authorized to access the first and second threads, wherein the third icon is displayed in the user interface in the first color coding, wherein the fourth icon is displayed in the user interface in the second color coding, wherein authorization to a thread comprises an ability to view and participate in the thread, and displays in the user interface a priority of a problem to be solved through the collaborative effort system.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments described herein provide systems and processes for generating and managing multiple chat features within a collaborative effort or system, such as a war room, chat room, dialogue program, social network, etc. Further, various embodiments described herein provide enabling multiple chat threads within a single collaborative effort system. Moreover, various embodiments described herein enable selectively enabling specific users or groups of users to one or more of a multiple of threads within a collaborative discussion system.

As problems arise in various systems, depending on the seriousness and/or complexity of the problem, the problem may be routed to one or more subject matter experts (SME). As applications and systems have increased in complexity, multiple SMEs may participate to collectively and collaboratively figure out where a given problem lies and how to fix it. That is, multiple SMEs (or other persons) may perform a collaborative effort to understand a given problem, identify where the problem exists, and find a resolution to the problem. In high pressure problems it is common to have upward of twenty-five or more people collaborating to solve a single problem. Further, in certain situations, various groups of SMEs that may specialize in particular areas may be grouped to address sub-issues, sub-problems, or various specific aspects of a larger problem that has been identified. SMEs or various groups of SMEs may also be employees of other companies that are contracted to support their specific technical area.

One option to enable a collaborative effort is the use of group chat and/or networking, which may be the basis for group collaboration in a "virtual war room" capability. As used herein, the term "collaborative effort system" will be used to refer to a group chat, virtual war room, instant messaging, short message services, blog, website, online community, news feed, email, wiki, etc., or other social or collaborative application, process, and/or system. The collaborative effort system may contain the dialog of interactions back and forth between several SMEs and other persons as they chase leads and ultimately uncover key symptoms of the problem. The collaborative effort system may also include the discussion that the SMEs and other persons have when they find or identify the problem and the actions they took in response to the problem, whether the actions were successful or not. That is, the collaborative effort system will thus contain all of the information uncovered through the problem-resolution cycle that is performed by the SMEs within the collaborative effort system. This information may include hundreds or thousands of messages spanning not only the ultimate resolution to the problem, but may include all of the details about the paths and options investigated and subsequently cleared of being a cause of the problem and/or potential solutions that were not completed or sufficient to solve the problem adequately.

Certain complex problems may require SMEs and other persons from various technical backgrounds to discuss a feature or aspect of the problem and resolve an issue or problem within the specific technical area. As such, multiple, different groups of people may be working on different aspects of a problem. Embodiments described herein enable a single collaborative effort system that incorporates multiple sub-discussions wherein users may be assigned to various sub-discussions (all or a portion thereof), and thus enables synchronization of work between the various groups and discussions.

Creating multiple collaborative effort systems is one solution when setting off multiple teams to focus on different parts of a problem, but this may result in a fragmented approach. However, as disclosed herein, a single collaborative effort system is employed and leverages group chat, threads, and authorization to enable a single discussion format with multiple parts. During an active discussion in a collaborative effort system, users within a sub-portion of the collaborative effort system may each be able to post comments, pictures, questions, etc. as is normal.

Figure 1:
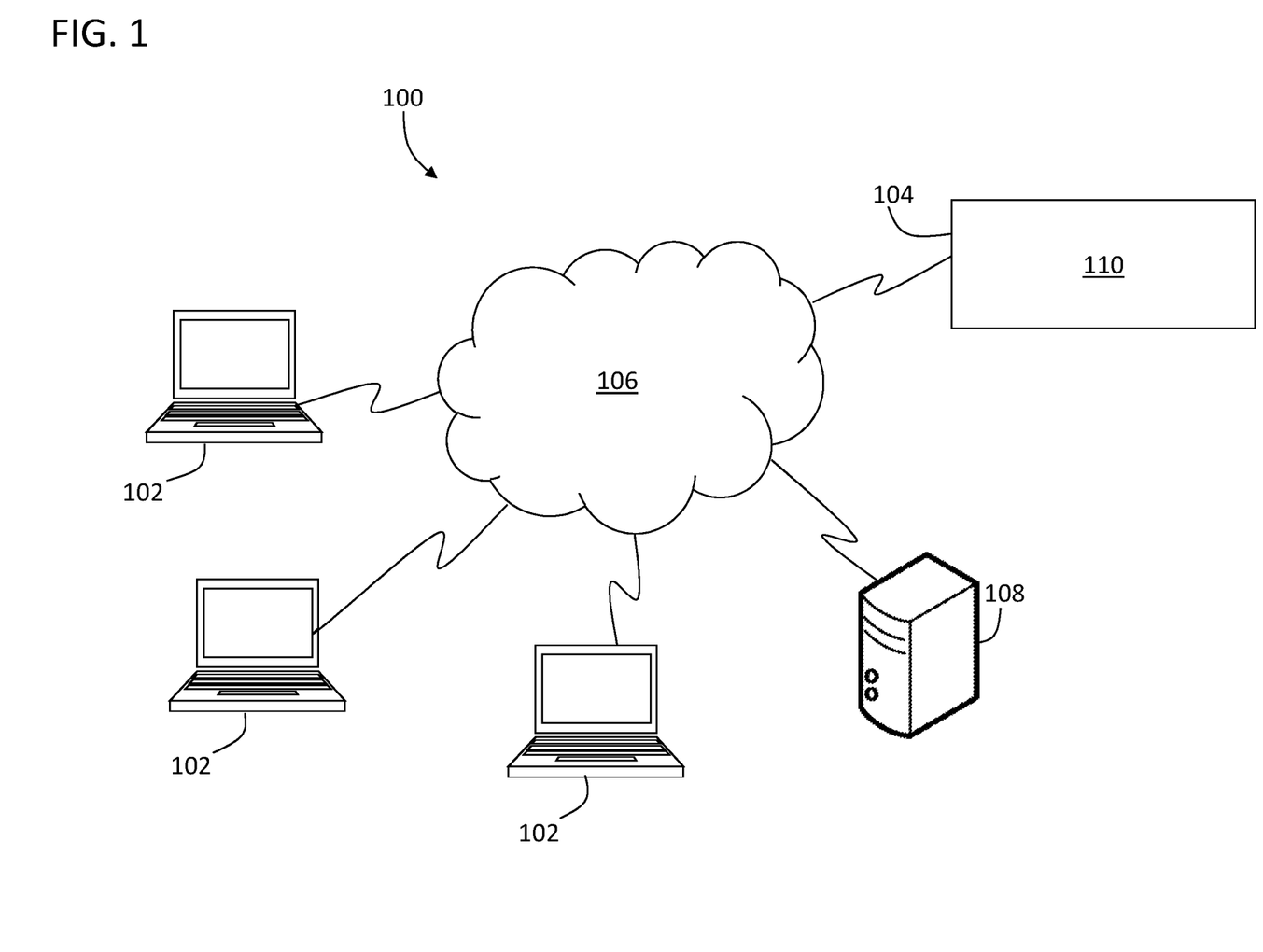
FIG. 1 depicts a block diagram of a system for enabling collaborative efforts to generate collaborative content in accordance with an embodiment.

Referring to FIG. 1, a block diagram of a system 100 for enabling a collaborative effort system and tracking and managing portions of a discussion in accordance with an embodiment is shown. The system 100 includes a chat or discussion application, hereinafter collaborative effort system 110, for performing the processing described herein that is executed by one or more computer programs located on a host system 104 and/or a user system(s) 102.

The system 100 depicted in FIG. 1 includes one or more user systems 102 through which users, e.g., SMEs and other persons, at one or more geographic locations may contact the host system 104 to initiate programs and/or participate in the collaborative effort system 110. The user systems 102 are coupled to the host system 104 via a network 106. Each user system 102 may be implemented using a general-purpose computer executing a computer program for carrying out the processes described herein. The user systems 102 may be user devices such as personal computers (e.g., a laptop, a tablet computer, a cellular telephone, etc.) or host attached terminals. If the user systems 102 are personal computers, in some embodiments, the processing described herein may be shared by a user system 102 and the host system 104. The user systems 102 may also include game consoles, network management devices, and field programmable gate arrays. In addition, multiple user systems 102 and/or host systems 104 may be concurrently operating to aggregate web interactions for personalized usage.

The network 106 may be any type of known network including, but not limited to, a wide area network (WAN), a local area network (LAN), a global network (e.g. Internet), a virtual private network (VPN), a cloud network, and an intranet. The network 106 may be implemented using a wireless network or any kind of physical network implementation known in the art. A user system 102 may be coupled to the host system through multiple networks 106 (e.g., cellular and Internet) so that not all user systems 102 are coupled to the host system 104 through the same network 106. One or more of the user systems 102 and the host system 104 may be connected to the network 106 in a wireless fashion. In one non-limiting embodiment, the network is the Internet and one or more user systems 102 execute a user interface application (e.g. a web browser) to contact the host system 104 through the network 106. In another non-limiting example embodiment, the user system 102 is connected directly (i.e., not through the network 106) to the host system 104. In a further non-limiting embodiment, the host system 104 is connected directly to or contains a storage device 108.

The storage device 108 includes data relating to the collaborative effort system 110 and/or data relating to a problem to be solved. In some embodiments, the storage device 108 may be implemented using a variety of devices for storing electronic information. In an example embodiment, data stored in the storage device 108 includes, but is not limited to, one or more search data and search history databases, and other data utilized by embodiments described herein. It is understood that the storage device 108 may be implemented using memory contained in the host system 104 or that it may be a separate physical device. The storage device 108 may be logically addressable as a consolidated data source across a distributed environment that includes the network 106. Information stored in the storage device 108 may be retrieved and manipulated via the host system 104 and/or via a user system 102.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access, e.g., permitting only designated SMEs and/or other authorized persons to access the collaborative effort system 110. For instance, an administrator may have access to the entire system and have authority to modify portions of the system and/or permissions thereto. A firewall may be implemented using conventional hardware and/or software as is known in the art.

The host system 104 may also operate as an application server. The host system 104, in such embodiments, may execute one or more computer programs, including the collaborative effort system 110, to provide aspects of embodiments as described herein. Processing may be shared by the user system 102 and the host system 104 by providing an application to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

During a collaborative effort, one or more users, e.g., SMEs and other persons, may use a user system 102 to communicate through the network 106 and participate in a discussion on the host system 104 employing the collaborative effort system 110. In some embodiments, users or groups of users may be divided into different groups and/or threads that are carried out in parallel.

Figure 2:
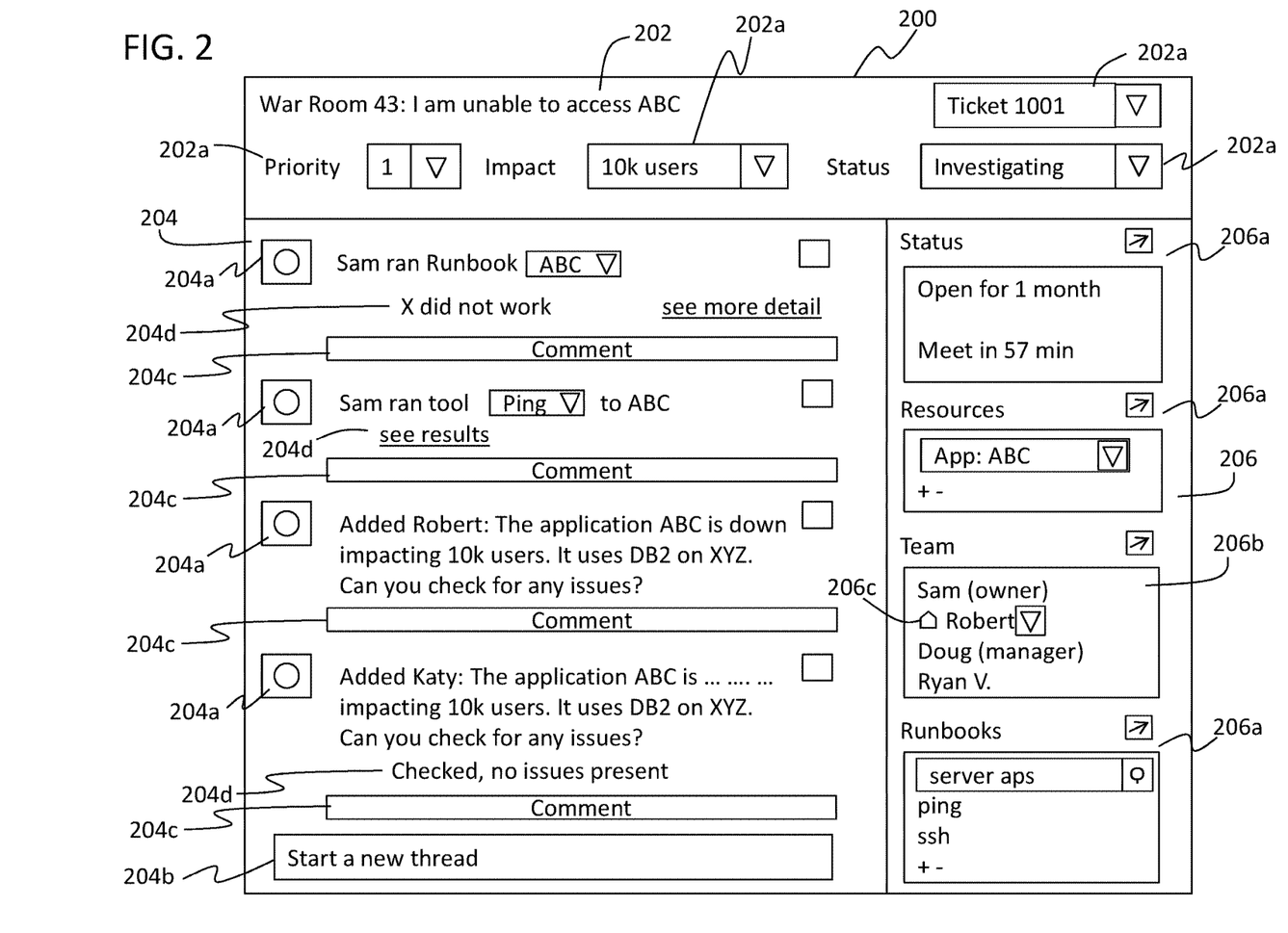
FIG. 2 depicts an illustrative view of a user interface of a collaborative application incorporating features in accordance with an embodiment.

Turning to FIG. 2, a non-limiting example of a collaborative effort system user interface 200 incorporating an example embodiment of the present disclosure is shown. The user interface 200 may be a visual representation of the collaborative effort system 110 presented on a user device 102 as executed by a host system 104. User interface 200 may include one or more windows configured to provide functionality and/or information therein. For example, a first window 202 may provide general information about the particular collaborative effort system, a second window 204 may provide information and contain content regarding the process to reach a solution to the problem (i.e., a discussion), and a third window 206 may provide additional information and/or options within the user interface 200. Each of these example potential windows of the non-limiting embodiment will now be described.

The first window 202 may provide general information about the particular collaborative effort system. As shown, first window 202 includes a war room number ("war room 43") and a description of the general problem to be solved within war room 43: "I am unable to access ABC." ABC may be a program, application, server, website, and/or other virtual or physical element that may be subject to one or more problems. Also included in the first window 202 may be one or more modifiable fields 202a that provide additional general information related to the problem, including, but not limited to priority, status, impact, etc. As shown, FIG. 2 indicates a matter number "ticket 1001." Additionally, a priority field is present, and as shown is indicated as "Priority 1." Impact information may also be provided, indicating the impact of the identified problem, and here is shown as 10,000 users are impacted. Finally, as shown, first window 202 may include a status field that indicates the status of the progress on the problem, and is shown as "investigating." Those of skill in the art will appreciate that the first window 202 may include other fields, information, etc. and/or combinations thereof.

The second window 204 may provide information and contain content regarding the process to reach a solution to the problem. That is, the second window 204 may be a chat window, discussion, threads, or log of the process including the content of the collaborative effort submitted by users of the collaborative effort system. The content may be represented by one or more log elements 204a that are located within the second window 204. The log elements 204a may be threads, comments on threads, entries provided by users, pictures, URL links, etc., hereinafter "content." Comments on specific threads may be provided in a comments element 204c. For example, each log element 204a may be a thread that addresses one sub-problem, a comment directed to a specific user, thoughts and conversations, etc., or combinations thereof. Alternatively, or in combination, log elements 204a may be each entry within the collaborative effort system within the second window 204. Each log element 204a may be an entry in the collaborative effort system in interface 200 that has already been submitted. The log elements 204a thus form the content of the collaborative effort system.

New thread-level log elements 204a may be created by a user interacting with an entry element 204b. Entry element 204b may be configured to allow users to type information into the second window 204, such as provide a comment, add a new thread and comments therein, and/or pose questions. The entry element 204b is how a user may generate a new log element 204a, thus expanding the top-level or thread-level content within the collaborative effort system. Similarly, log elements 204a may be created within a thread by a user interacting with comments element 204c. Comments element 204c may be configured to allow users to type information into the second window 204, such as to provide a comment and/or pose a question; all within the context of a given thread. The comments element 204c may be used to generate new log elements 204d within a specific thread, thus expanding the discussion within a given thread. As the entry elements 204b and comments element 204c are used to create new content, the log elements 204a, 204c that are already within the second window 204 may scroll upward and out of the second window 204.

The third window 206 may provide additional information and/or options within the user interface 200. For example, as shown, the third window 206 may include supporting elements 206a. One supporting element 206a may be a status element that indicates the duration of the problem, e.g., when the problem was identified, and may also include milestone or event timers such as indicators when meetings or calls may be required of the users of the collaborative effort system. Supporting elements 206a may also include links or other methods of retrieving and/or accessing information, programs, etc. that are outside of the interface 200 and/or outside of the collaborative effort system. For example, a supporting element 206a may provide direct access for a user to access operational or ownership details of an application shown here as "App: ABC." Supporting elements 206a may also include a listing of the users (list 206b), e.g., the SMEs and other persons involved with the project/problem, and further may enable direct contact between one or more specific users. For example, a supporting element 206a may enable a direct messaging service to users of the collaborative effort system. Other user-specific information may be provided within the supporting elements 206a, such as user position, user access, company affiliation, etc. Further, links to runbooks or other pre-existing material that are associated with the problem and/or associated with systems, elements, etc. associated with the program or other systems that includes the problem may be provided in supporting elements 206a.

As noted, one of the supporting elements 206a in the third window 206 may be the list 206b of the participants and/or groups participating in the collaborative effort system. Each of the users within the list 206b may be associated, authorized, and/or organized into various groups that may have access to some or all of the threads of the collaborative effort system. An indicator 206c may be provided with each user or group of users, indicating the group they are associated with, and thus indicating the access or authorization to which the particular user or group of users may have be provided.

Although a single configuration of a user interface 200 of a collaborative effort system is shown herein, those of skill in the art will appreciate that the user interface 200 may take any number of formats and/or configurations. For example, in some embodiments, the user interface 200 may comprise a single window with multiple aspects thereto and/or all of the above describe capabilities may be configured within a single window or application user interface. In other embodiments, each window may be a separate feature of the collaborative effort system. Thus, the illustration of FIG. 2 is not intended to be limiting but rather is provided for illustrative and discussion purposes.

Figure 3:
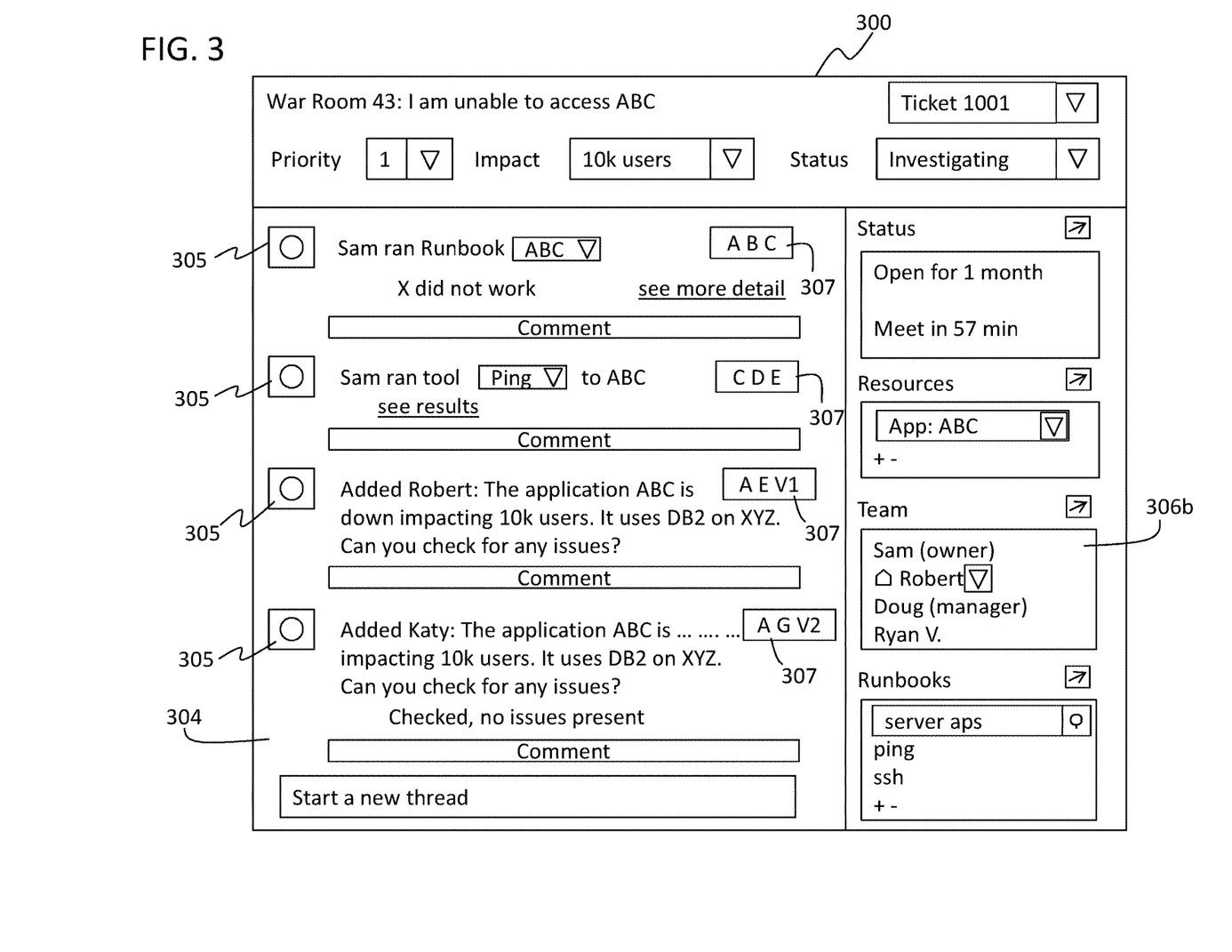
FIG. 3 depicts an illustrative view of a user interface box in accordance with an embodiment.

Turning now to FIG. 3, a non-limiting example of a user interface for authorization and grouping will now be provided. The user interface 300 may be substantially similar to the user interface 200 of FIG. 2 and described above, and thus the description of the same or similar features will not be repeated herein for simplicity. Within the second window 304 of the user interface 300, i.e., the chat area, multiple parallel threads 305 may be presented, wherein each thread 305 may be a log element of the collaborative effort system. Each thread 305 can be commented on individually and can be created for different purposes. For example, a thread could be created asking a user or group of users to investigate a particular aspect of the problem. As another example, a thread could be created for a whole team, e.g., a group of users, to focus on one area of the problem. In such divisions, only certain users may need or have access to the associated thread, but may not need or be entitled to have access to other portions of the collaborative effort. For example, if trade secret or other sensitive information is being considered in the problem solving, it may be beneficial to enable access to the information to certain users, but also to enable other users to participate in the collaborative effort.

In one example configuration, a default setting may be that any user having access to the collaborative effort system may have access to what is happening in all threads, i.e., all users may have all-access to the entire system. However, when a new thread is created, a user can limit access to the new thread. For example, the creator of the new thread may be able to provide a list of users that should have visibility to the new thread and the ability to participate in the thread. In such an example, the list of authorized users may be selected from a drop-down menu, check-box list, etc. that provides a list of all users, user groups, and/or combinations thereof that are participating in the collaborative effort system.

In this manner, a user that creates a thread is enabled to identify different users or user groups for different threads. In another example, different groups of users may have access to different threads, and at least one coordinator may have access or visibility across all threads. As used herein a coordinator may be a manager or other user that has access to all threads, and all other users may have access to a subset of the threads. In some embodiments, multiple coordinators may participate in the collaborative effort system, and in some such embodiments, each coordinator may have access to a sub-set, with no coordinator having access to all threads. Such situations may arise when two companies are addressing a problem and both companies have confidential information, and so the access may only overlap to a shared thread, and then the users from the two companies may have access only to specific subsets of the threads of the collaborative effort system.

As shown in FIG. 3, each thread 305 may have an access indicator 307. The access indicator 307 may be a list of the users or user groups that have access to the particular thread 305. As shown in the example of FIG. 3, there are four threads 305 defined. Further, in this example, users A, B, C, D, E, and G, and visitors V1 and V2 have access to at least parts of the collaborative effort system. In this example, users A, B, and C have access to the first thread 305. Users C, D, and E have access to the second thread 305. Users A and E and visitor V1 have access to the third thread 305, and users A and G and visitor V2 have access to the fourth thread 305. As illustrated, none of the users or visitors have access to all of the threads. A coordinator, not shown, may have access to all of the threads 305.

As shown, FIG. 3 illustrates when an outsider or visitor may be granted access to part of the collaborative effort system. This may be used for the case where a user of the collaborative effort system has included out-of-network support to some other users, e.g., a coordinator needs to grant access to persons not within a company. In such cases, the coordinator may invite the visitors to the collaborative effort system. During this process the coordinator may limit the visitor access to see only threads, or portions thereof, that are relevant to the visitor's participation.

As will be appreciated by those of skill in the art, users and/or visitors, hereinafter "user" or "users," may be added and removed from any thread or group of threads. Further, this may be done in an ongoing basis as need arises in a particular situation. In some embodiments, when a new user gains access to a new thread, the entire thread may be present for the new user such that they can view the entire transcript of that particular thread. In an alternative embodiment, a new user may only be able to see content that is generated in the thread from the point the new user is granted access. A new user granted access to the entire collaborative effort system may view or be shown only the threads the new user has been granted access to. Further, in some embodiments, the new user may only be able to view the list 306b of participants that have access to the same thread(s) as the new user.

Figure 4:
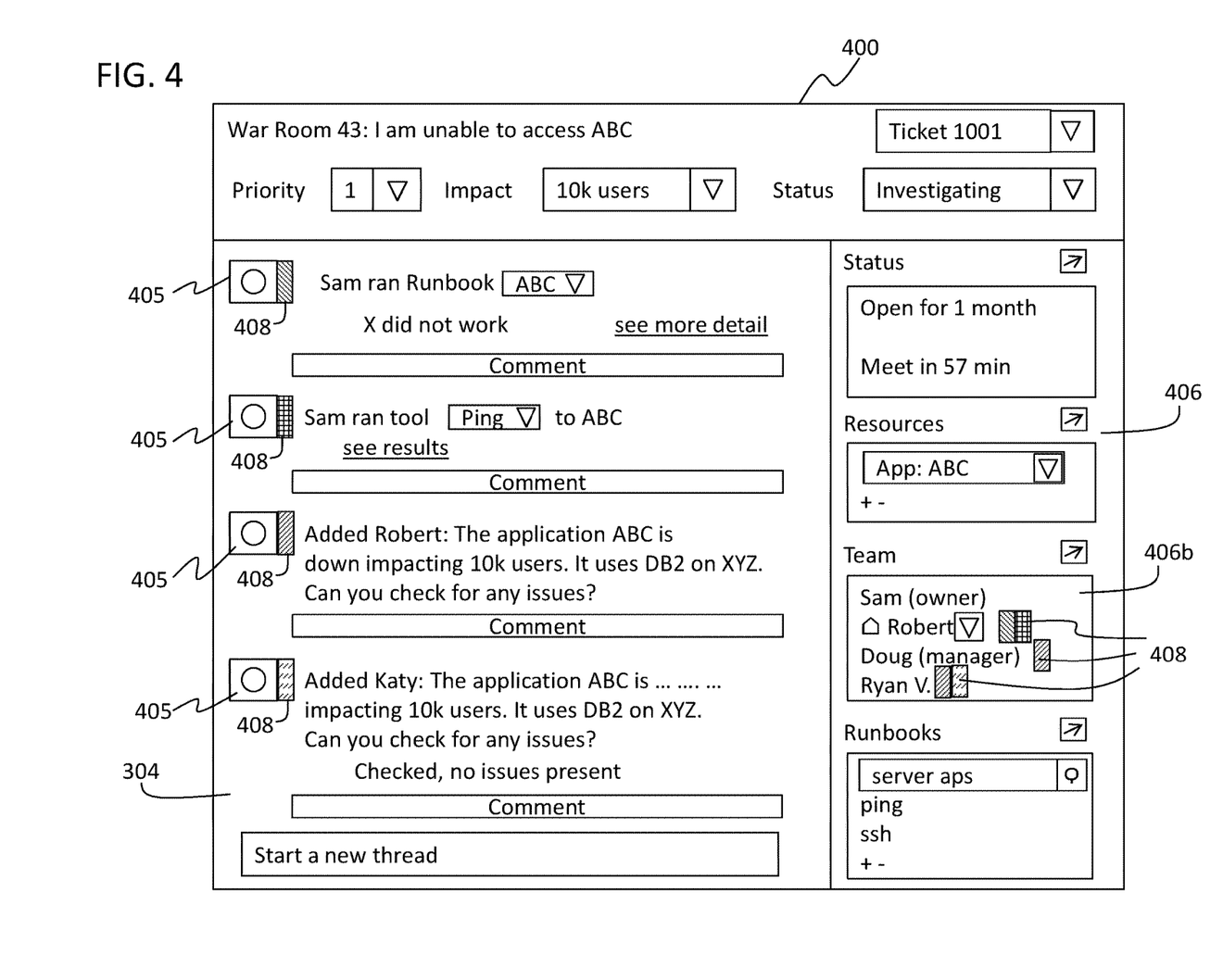
FIG. 4 depicts an illustrative view of a user interface box in accordance with another embodiment.

Turning now to FIG. 4, and alternative embodiment of the present disclosure is shown. The embodiment of FIG. 4 may be substantially similar to that shown and described with respect to FIG. 3, and thus the similar features will not be described again for simplicity. The primary difference in the embodiment of FIG. 4 may be how the user affiliations (i.e., user access) is displayed. In FIG. 3, access indicator 307 is used, which indicates users having access to various threads. In the embodiment of FIG. 4, color coding 408 may be used for the threads 405 in the second window 404 of the user interface 400. The users displayed in the list 406b, in the third winder 406, may also indicate the color coding 408 to help identify which specific threads 405 uses have access to.

In addition to the above described authorization and separation of users between threads within the collaborative effort systems, some context may be shared across all users in the collaborative effort system. For example, any specific resources identified as relevant to the problem being addressed. In such an example, the specific resources may be what one or more users have identified as the potential culprit in the problem. All users may be able to view and/or access the specific resource(s) and use it to aid in the user's diagnostics. Further, although not shown herein, those of skill in the art will appreciate that the user interface of the collaborative effort system may include a summary view in one of the windows, e.g., the third window, where each user or group of users, e.g., a team, can provide updates and/or statements on progress. In this manner the collaborative effort can be partitioned multiple ways (e.g., by user(s), by threads, by technologies, etc.) and it may be easy to see the entire view while enabling sharing of context across all users of the collaborative effort system.

Figure 5:
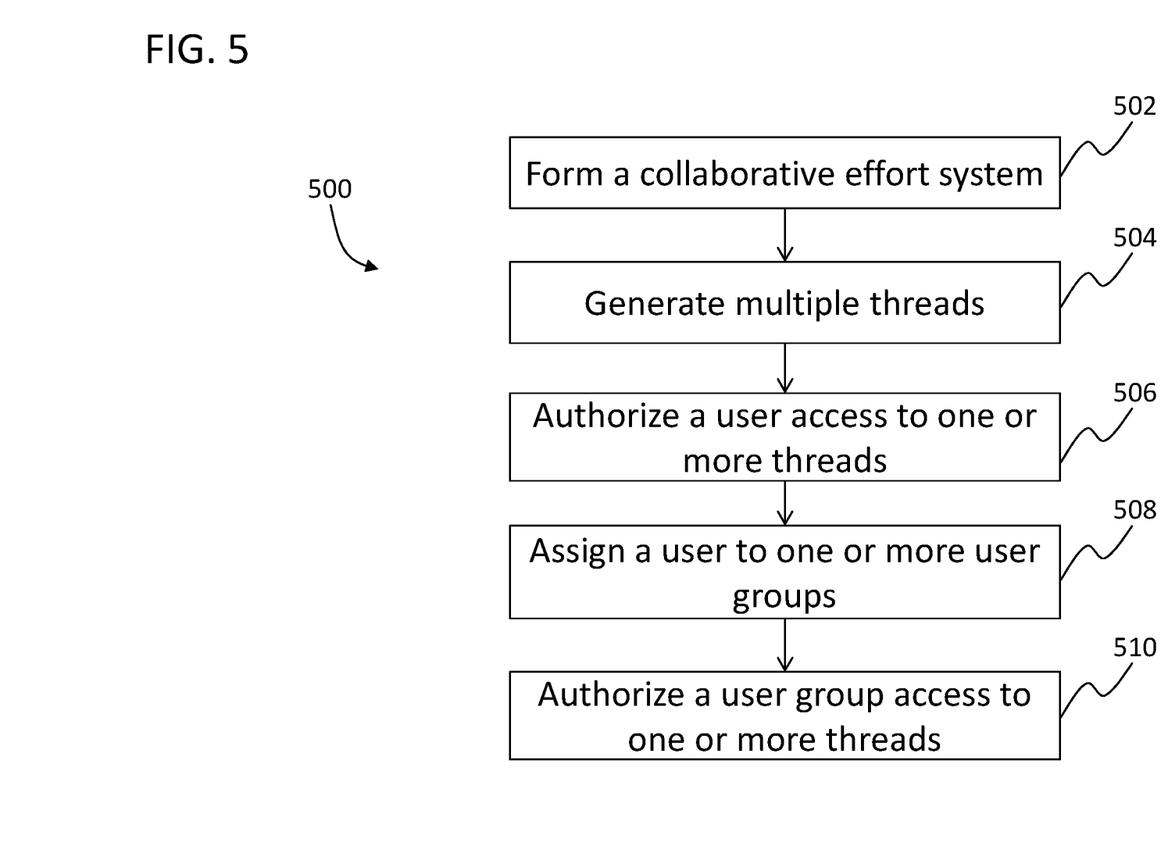
FIG. 5 depicts a flow process of mining data in accordance with an embodiment.

Turning now to FIG. 5, a process flow 500 for managing users in a collaborative effort system in accordance with an embodiment of the present disclosure is shown. Process flow 500 may be similar to that described above, and may be implemented on a host system and/or a user system. Process flow 500 may represent the operation of a collaborative effort system that is used by one or more users to solve an identified problem, but may also be used in any group discussion format, system, program, application, etc.

A collaborative effort system may be formed, as shown at block 502. The formation of the collaborative effort system may be implemented on a host system and/or a user system and may be used to enable multiple users to collaborate to solve a problem. The collaborative effort system may receive input to form one or more threads, and in this example, multiple threads will be created, as shown at block 504. Each thread may be formed for a specific task to be solved and/or for a specific purpose, such as a discussion on a particular topic, etc.

Next, as shown at block 506, one or more users may be authorized or granted access to one or more of the threads. The user may be able to participate and view only those threads to which they have access. In one non-limiting example, a coordinator may grant the access to the specific user. The coordinator may be a user that has "full access" or access to all threads and further may have authorization granting authority. In some embodiments there may be multiple coordinators, and some coordinators may have authorization granting authority to a subset of the threads of the collaborative effort system. In some embodiments the user may be a "visitor" that is granted limited access to the collaborative effort system.

Further, a user may be assigned to one or more user groups, as shown at block 508. The user group may be a group of users that are affiliated by one or more criteria, e.g., based on company, based on technology area of expertise, based on a level of access, etc. The user groups may then be authorized to one or more threads, as shown at block 510. As such, a group of users may be able to be assigned and authorized to a thread in a single action, rather than assigning each individual user to the thread or to multiple threads.

Those of skill in the art will appreciate that the process flow 500 may include additional and/or alternative features and/or various processes may be performed simultaneously, nearly simultaneously, and/or in a different order than that shown in process flow 500. For example, in some embodiments, users may be grouped into user groups prior to generating the various threads.

Technical effects and benefits include a virtual application configured to enable collaborative work and managing users and user groups within a collaborative work, e.g., a collaborative effort system as described above. Further technical effects and benefits include providing user authorization and/or access to various elements of a collaborative effort system (e.g., discussion, war room, chat room, instant messaging, emails, short message service elements, blog entries, website entries, online community entries, news feed items, wiki entries, etc.) that may be used to grant or prevent a user or group of users access to parts of the collaborative effort system.

As will be appreciated by those of skill in the art, the collaborative effort system, or memory associated therewith, may be configured to persist the set of users authorized to each thread in the collaborative effort system, and, in aggregate, persist the set of users having access to the entire collaborative effort system (e.g., coordinators). Furthermore, in some embodiments, a transcript or record of the discussions taking place in the collaborative effort system may be saved spanning all threads, and the access or authorization may be saved therewith. Thus, even after the effort is completed, the transcript may be made available by the users (or others) with specific assigned authorizations or levels of access. Thus, the record may be made searchable to help with future problems.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to manage user access to a collaborative effort system that incorporates multiple sub-discussion groups, the method comprising:
    providing, by a processor, a user interface allowing a first user access to the collaborative effort system;
    responsive to the first user utilizing the user interface:
        generating a plurality of threads within the collaborative effort system for a single discussion group of the collaborative effort system, wherein each thread of the plurality of threads comprises a different sub-discussion group of the single discussion group of the collaborative effort system;
        authorizing a second user access to at least a first thread of the plurality of threads after the generation of the plurality of threads;
        associating the second user with a user group after the generation of the plurality of threads; and
        after associating the second user with the user group, authorizing the user group access to at least a second thread of the plurality of threads;
        generating a plurality of icons displayed in the user interface for the plurality of threads, wherein a first icon of the plurality of icons is displayed in the user interface in a first color coding, wherein a second icon of the plurality of icons is displayed in the user interface in a second color coding;
        generating a third and fourth icon displayed in the user interface to indicate that the second user is authorized to access the first and second threads, wherein the third icon is displayed in the user interface in the first color coding, wherein the fourth icon is displayed in the user interface in the second color coding, wherein authorization to a thread comprises an ability to view and participate in the thread; and
        displaying in the user interface a priority of a problem to be solved through the collaborative effort system.

2. The computer implemented method of claim 1, wherein the first user is a coordinator that has full access to the collaborative effort system.

3. The computer implemented method of claim 1, further comprising displaying in the user interface impact information of the problem to be solved and status of the problem to be solved.

4. The computer implemented method of claim 1, further comprising:
    responsive to the first user utilizing the user interface, associating a third user with the user group after authorizing the user group access to the at least second thread; and
    presenting an entire transcript of the at least second thread to the third user after associating the third user with the user group.

5. The computer implemented method of claim 1, further comprising:

saving a content of the collaborative effort system; and
saving a record of user authorizations with the saved content.

6. The computer implemented method of claim 1, further comprising:
responsive to the first user utilizing the user interface, authorizing the second user access to a subset of the plurality of threads.

7. The computer implemented method of claim 1, further comprising:
displaying in the user interface a list of users and the icon associated with each user.

8. A system to manage user access to a collaborative effort system that incorporates multiple sub-discussion groups, the system comprising:
a memory having computer readable instructions; and
a processor configured to execute the computer readable instructions, the computer readable instructions comprising:
providing a user interface allowing a first user access to the collaborative effort system;
responsive to the first user utilizing the user interface:
generating a plurality of threads within the collaborative effort system for a single discussion group of the collaborative effort system, wherein each thread of the plurality of threads comprises a different sub-discussion group of the single discussion group of the collaborative effort system;
authorizing a second user access to at least a first thread of the plurality of threads after the generation of the plurality of threads;
associating the second user with a user group after the generation of the plurality of threads; and
after associating the second user with the user group, authorizing the user group access to at least a second thread of the plurality of threads;
generating a plurality of icons displayed in the user interface for the plurality of threads, wherein a first icon of the plurality of icons is displayed in the user interface in a first color coding, wherein a second icon of the plurality of icons is displayed in the user interface in a second color coding;
generating a third and fourth icon displayed in the user interface to indicate that the second user is authorized to access the first and second threads, wherein the third icon is displayed in the user interface in the first color coding, wherein the fourth icon is displayed in the user interface in the second color coding, wherein authorization to a thread comprises an ability to view and participate in the thread; and
displaying in the user interface a priority of a problem to be solved through the collaborative effort system.

9. The system of claim 8, wherein the first user is a coordinator that has full access to the collaborative effort system.

10. The system of claim 8, wherein the computer readable instructions further comprise displaying in the user interface impact information of the problem to be solved and status of the problem to be solved.

11. The system of claim 8, wherein the computer readable instructions further comprise:
responsive to the first user utilizing the user interface, associating a third user with the user group after authorizing the user group access to the at least second thread; and
presenting an entire transcript of the at least one thread to the third user after associating the third user with the user group.

12. The system of claim 8, wherein the computer readable instructions further comprise:
saving a content of the collaborative effort system; and
saving a record of user authorizations with the saved content.

13. The system of claim 8, wherein the rule based algorithm comprises:
responsive to the first user utilizing the user interface, authorizing the second user access to a subset of the plurality of threads.

14. The system of claim 8, wherein the computer readable instructions further comprise:
displaying in the user interface a list of users and the icon associated with each user.

15. A computer program product to manage user access to a collaborative effort system that incorporates multiple sub-discussion groups, the computer program product comprising a computer readable storage medium having program instructions embodied therewith, the program instructions executable by a processor to cause the processor to:
provide a user interface allowing a first user access to the collaborative effort system;
responsive to the first user utilizing the user interface:
generate a plurality of threads within the collaborative effort system for a single discussion group of the collaborative effort system, wherein each thread of the plurality of threads comprises a different sub-discussion group of the single discussion group of the collaborative effort system;
authorize a second user access to at least a first thread of the plurality of threads after the generation of the plurality of threads;
associate the second user with a user group after the generation of the plurality of threads; and
authorize the user group access to at least a second thread of the plurality of threads after the second user is associated with the user;
generate a plurality of icons displayed in the user interface for the plurality of threads, wherein a first icon of the plurality of icons is displayed in the user interface in a first color coding, wherein a second icon of the plurality of icons is displayed in the user interface in a second color coding;
generate a third and fourth icon displayed in the user interface to indicate that the second user is authorized to access the first and second threads, wherein the third icon is displayed in the user interface in the first color coding, wherein the fourth icon is displayed in the user interface in the second color coding, wherein authorization to a thread comprises an ability to view and participate in the thread; and
displaying in the user interface a priority of a problem to be solved through the collaborative effort system.

16. The computer program product of claim 15, wherein the first user is a coordinator that has full access to the collaborative effort system.

17. The computer program product of claim 15, the program instructions executable by a processor further configured to cause the processor to:
responsive to the first user utilizing the user interface, associate a third user with the user group after the user group is authorized to access to the at least second thread; and presenting an entire transcript of the at least one thread to the third user after associating the third user with the user group.

18. The computer program product of claim 15, the program instructions executable by a processor further configured to cause the processor to:
save a content of the collaborative effort system; and
save a record of user authorization with the saved content.

19. The computer program product of claim 15, the program instructions executable by a processor further configured to cause the processor to:
responsive to the first user utilizing the user interface, authorize the second user access to a subset of the a plurality of threads.

20. The computer program product of claim 15, the program instructions executable by a processor further configured to cause the processor to:
display in the user interface a list of users and the icon associated with each user.

* * * * *